Figure 7:
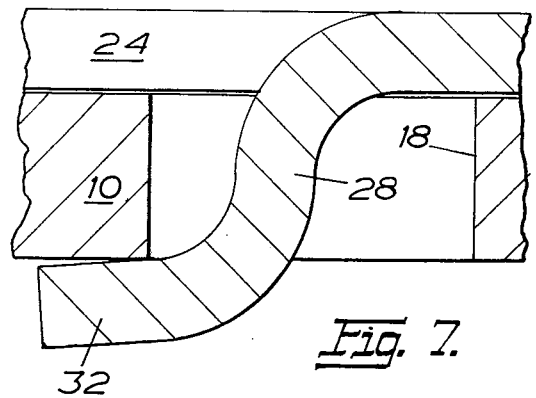

United States Patent [19]
Newstead

[11] 3,941,222
[45] Mar. 2, 1976

[54] VEHICLE SHOE DRUM BRAKES
[75] Inventor: Charles Newstead, Walsall, England
[73] Assignee: Girling Limited, Birmingham, England
[22] Filed: May 3, 1971
[21] Appl. No.: 139,822

Related U.S. Application Data
[63] Continuation-in-part of Ser. No. 802,125, Feb. 25, 1969, abandoned.

[52] U.S. Cl. .................. 188/250 G; 192/107 T
[51] Int. Cl.² ............................ F16D 69/00
[58] Field of Search ...... 188/234, 250 G; 192/107 T

[56] References Cited
UNITED STATES PATENTS

| | | | |
|---|---|---|---|
| 1,571,243 | 2/1926 | Down | 188/250 G X |
| 1,682,319 | 8/1975 | Bluhm | 188/234 |
| 1,771,595 | 7/1930 | Thompson | 188/250 G X |
| 1,857,124 | 5/1932 | Brackett | 188/250 G X |
| 1,857,125 | 5/1932 | Brackett | 188/250 G X |
| 1,867,348 | 7/1932 | Blume | 188/250 G |
| 2,158,337 | 5/1939 | Rasmussen | 188/250 G X |
| 2,361,307 | 10/1944 | Merritt | 188/234 |
| 2,631,697 | 3/1953 | Bonkowski | 188/234 |
| 3,181,657 | 5/1975 | Pelich et al. | 188/242 |

FOREIGN PATENTS OR APPLICATIONS

| | | | |
|---|---|---|---|
| 519,274 | 2/1931 | Germany | 188/250 G |

Primary Examiner—Trygve M. Blix
Attorney, Agent, or Firm—Scrivener Parker Scrivener and Clarke

[57] ABSTRACT

The invention concerns shoe drum brakes and provides for such brakes, a replaceable shoe lining component which is detachably secured to the shoe platform or backplate, the latter remaining permanently in position in the brake assembly. The lining component preferably comprises a thin carrier plate and a lining of friction material secured to the carrier plate; the shoe platform and the carrier plate having detachably inter-engageable means such as tongues and slots by which they are capable of being securely connected together in the brake assembly.

7 Claims, 11 Drawing Figures

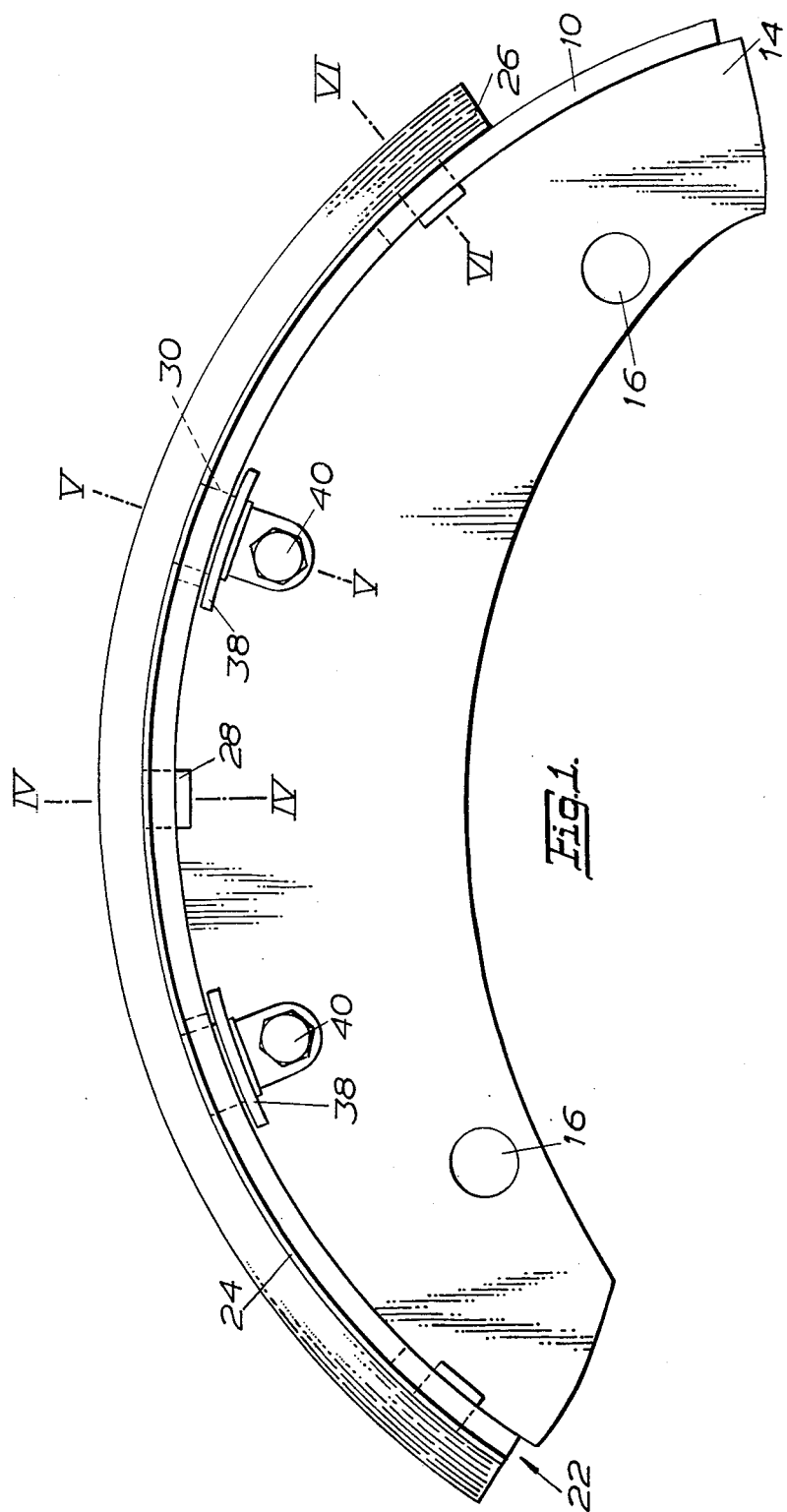

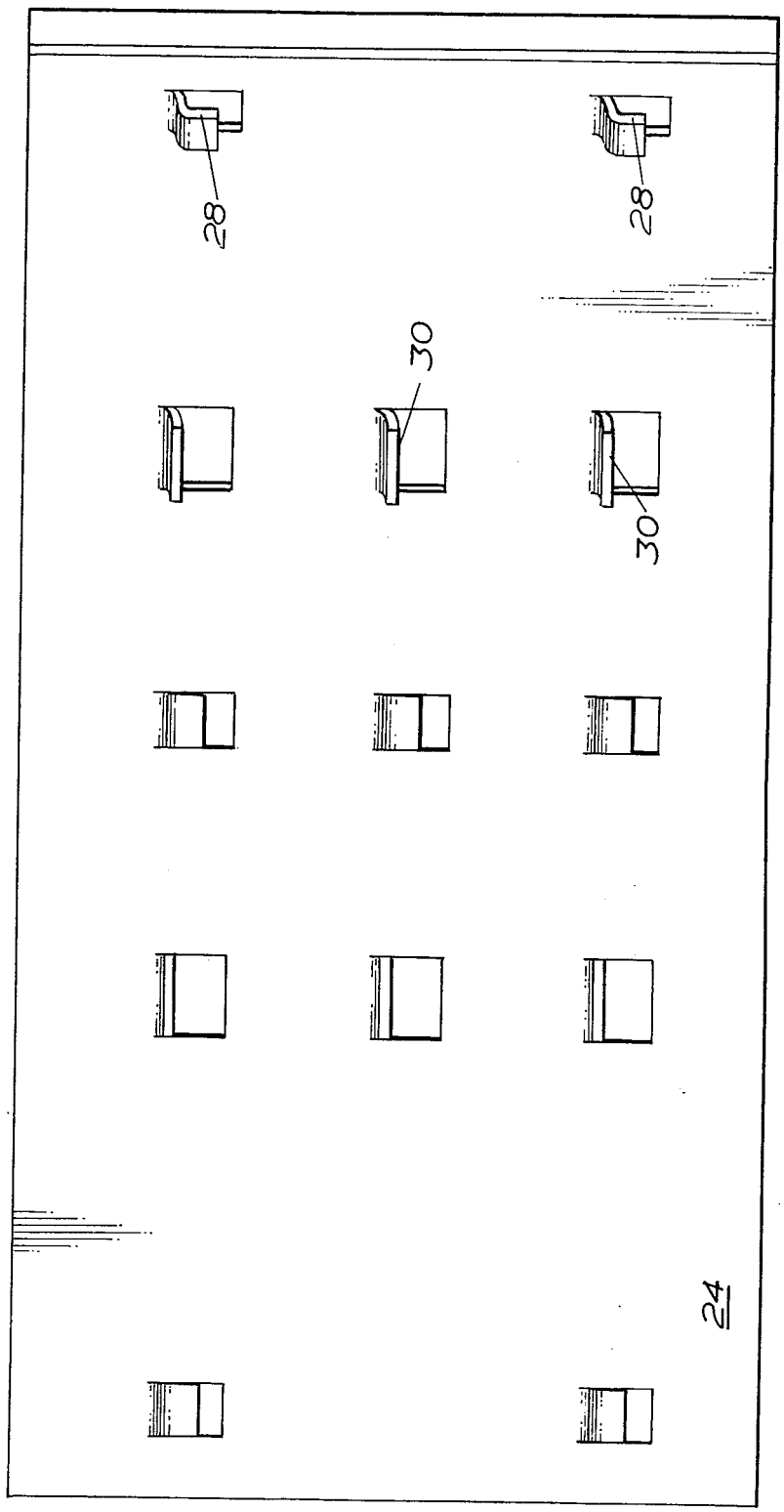

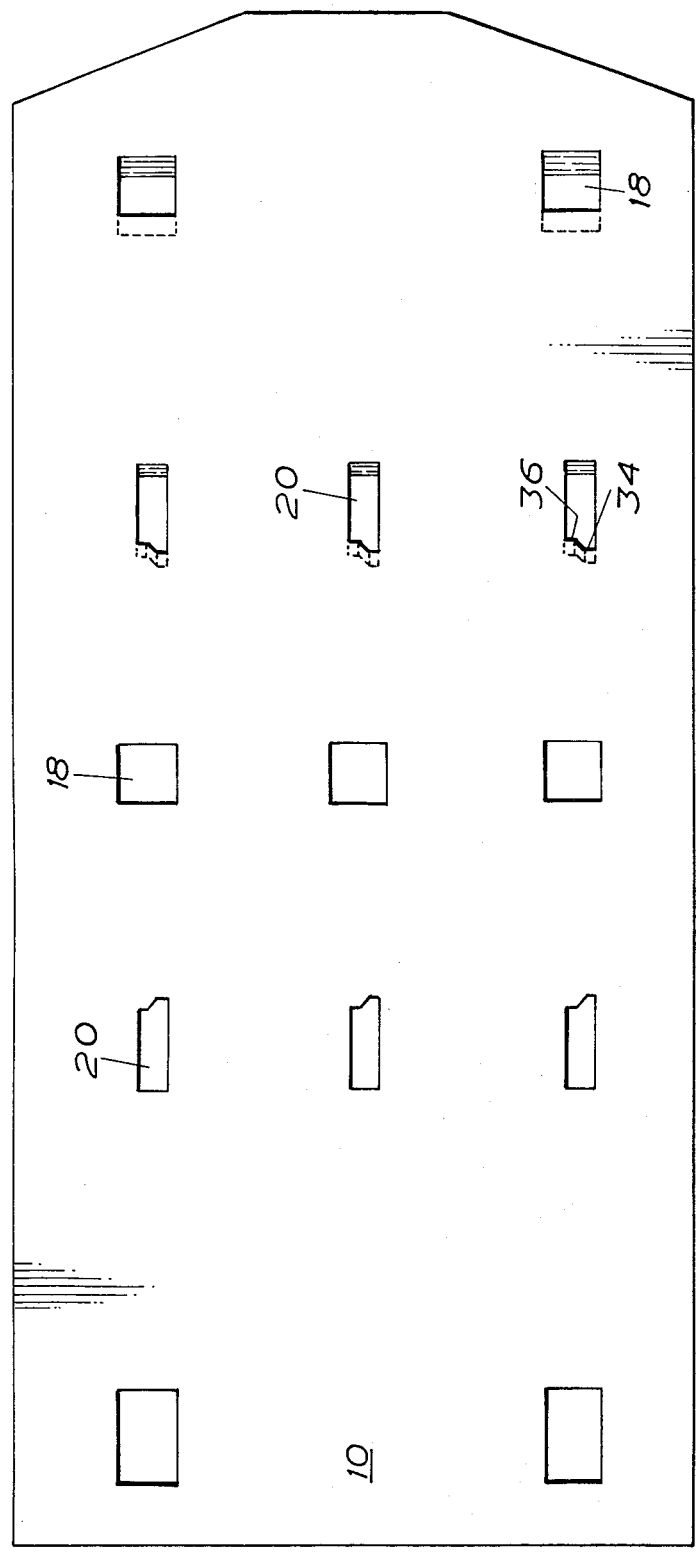

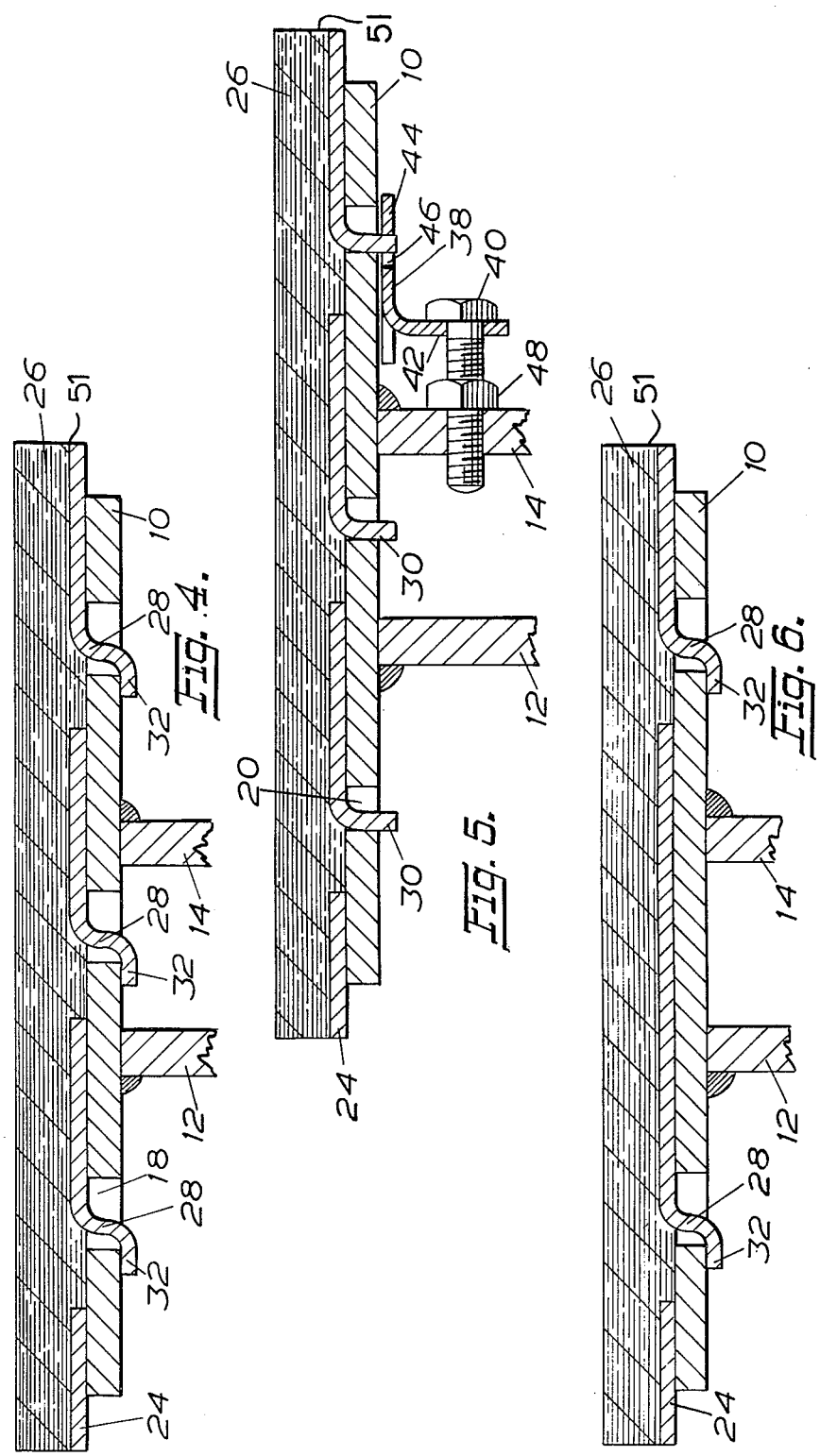

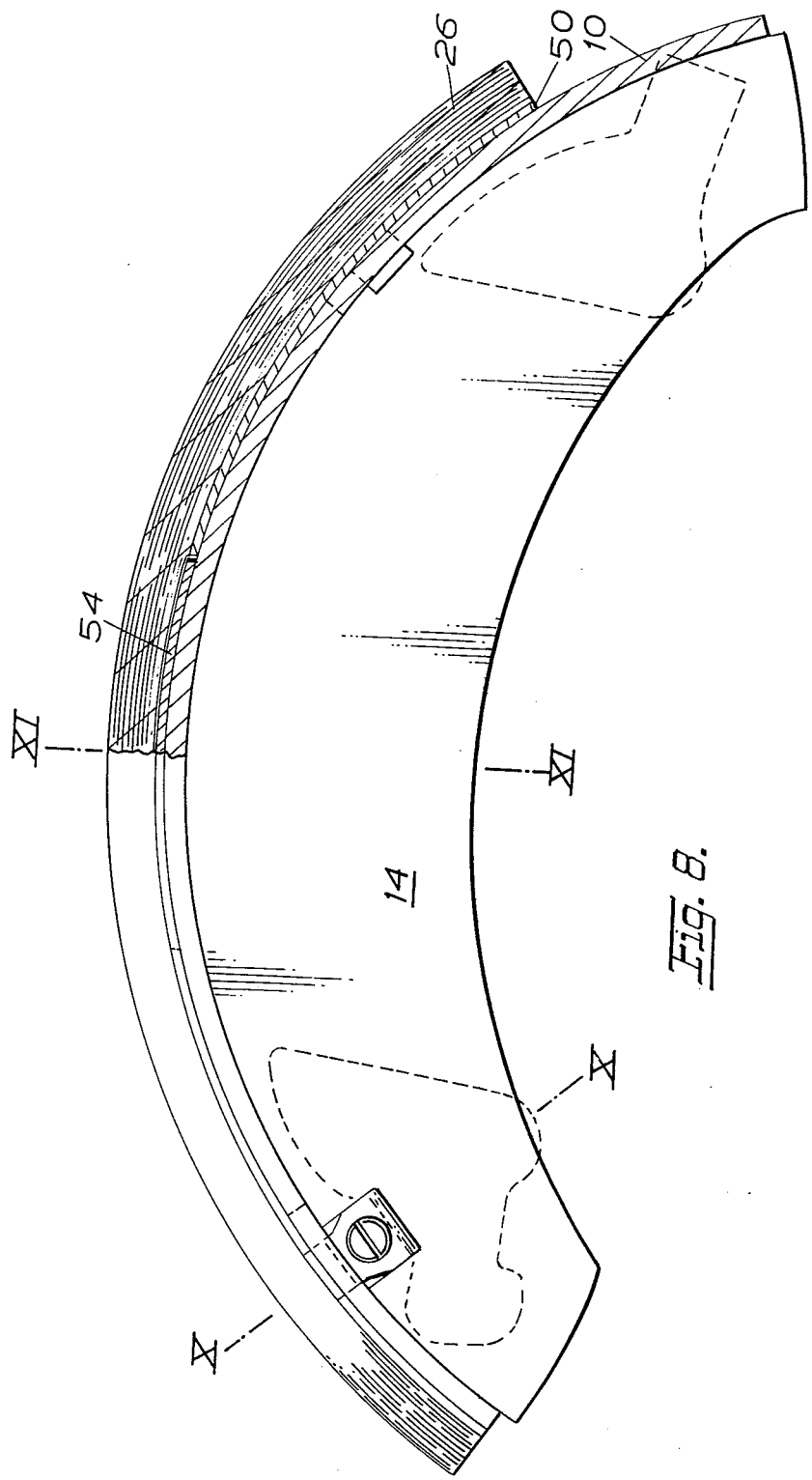

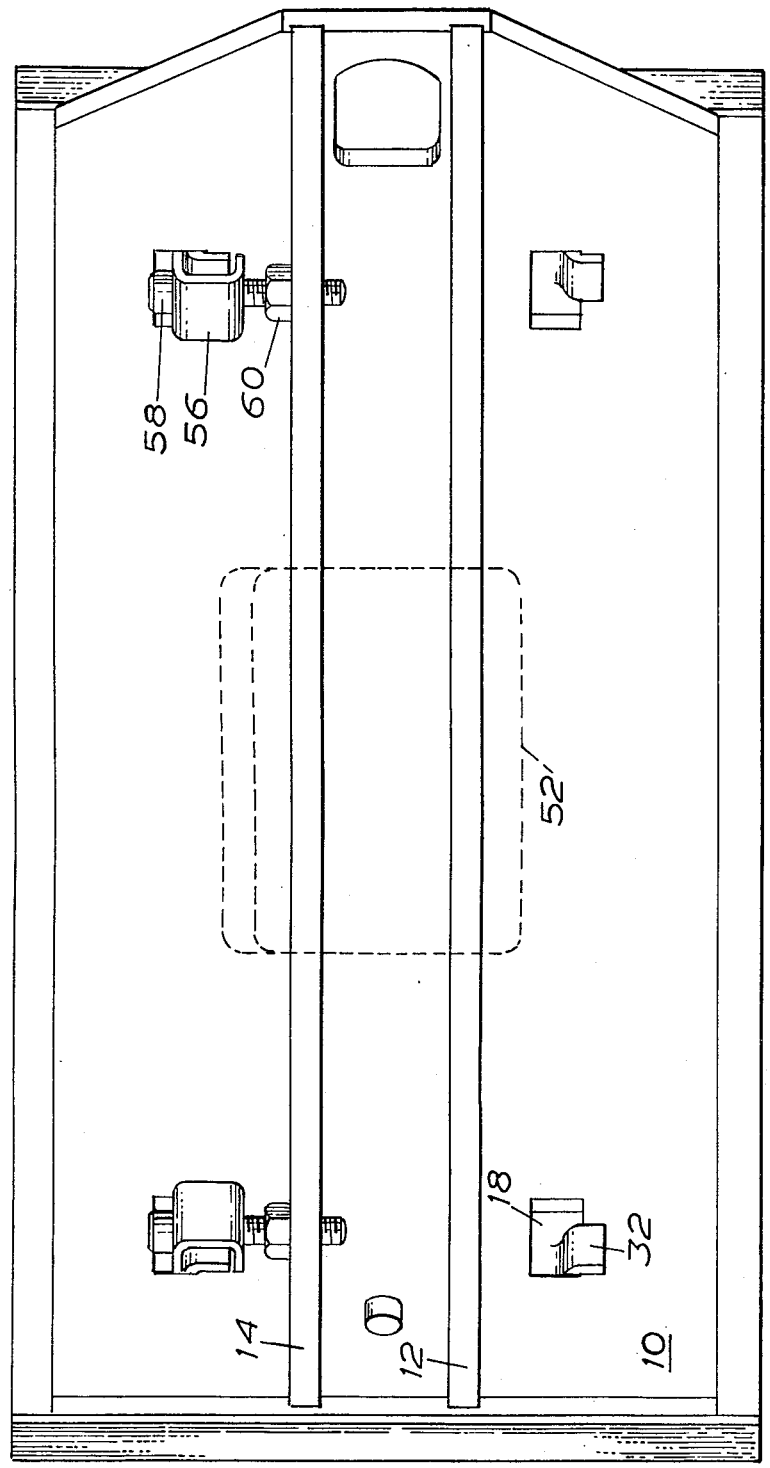

VEHICLE SHOE DRUM BRAKES

This is a continuation-in-part of application Ser. No. 802,125 filed Feb. 25, 1969, now abandoned.

This invention concerns vehicle shoe drum brakes.

Conventional shoe drum brakes employ replaceable brake shoes comprising a lining of friction material carried by a shoe back plate incorporating some form of fastening means, often one or more webs integral with the back plate, by which the latter is enabled to be mounted in operative relation with the remaining brake components assembled permanently on the vehicle. In some drum brake constructions, however, where the service conditions under which the brake operates demand adjustable lever and bell crank systems for transmitting brake actuating movements to the brake shoes, the replacement of brake shoes can be a difficult, skilled and time-consuming task and may entail virtually stripping down the whole of the brake assembly.

The invention seeks to provide a vehicle drum brake construction which simplifies the replacement of a worn shoe lining.

According to its broadest aspect, the present invention provides a vehicle shoe drum brake in which a shoe platform or back plate and a replaceable shoe lining component are formed with cooperating slots and projections by which the two are secured together and wherein said projections have axially directed portions which pass through said slots to engage behind said slots with surfaces of the shoe platform or the lining component respectively and thereby to lock said lining component to said platform.

By virtue of the invention, therefore, the shoe platform or back plate, which hitherto in conventional brake constructions has been detachable as a unit with the brake lining from the remainder of the brake assembly may now be left permanently in position in the rest of the brake assembly and the replacement of a worn shoe lining becomes merely a matter of releasing the locking projections from the shoe platform or the lining component respectively in order that a new lining component may be fitted.

Preferably the shoe lining component comprises a carrier plate which may be thin compared to the shoe platform and which carries a lining of friction material riveted or bonded thereto, although the latter is preferred. The aforementioned projections are preformed by being struck out of the carrier plate to engage in corresponding slots formed in the shoe platform, some of the projections comprising tongues terminating in free end portions extending parallel to the shoe platform, or nearly so, whereby to enable them, on being passed through the slots, to engage and lock behind the shoe platform. Conveniently, the terminal portions of the tongues are directed transversely or axially in the same direction of the lining component and are joined to the carried plate by generally radial portions so that the carrier plate is secured to the shoe platform by first positioning the lining component over the shoe platform with the projections respectively registering with the slots, then passing the projections radially through the slots and thereafter displacing the lining component axially of the shoe platform to lock the terminal portions of the tongues behind the platform. For the purpose of transferring the drag forces arising during braking from the lining component to the shoe platform, at least some of the slots may have a circumferential dimension which closely fits the cooperating projections but additionally or alternatively, manually releasable clamping means which also serve to prevent accidental separation of the lining component from the shoe platform may be arranged between the two.

A further advantage which may be obtained by the use of the present invention is that it is possible for a, for example, 6 or 7 inch wide shoe platform to support an 8 inch wide lining component, the resulting overhang being adequately supported by the backing plate. This enables shoe sizes to be standardised with consequential advantages in production and storage as less sizes will be necessary. If the backing plate is to overhang the shoe platform, it must be rigid enough to support the braking loads imposed thereon so that such load is applied substantially uniformly over the whole lining surface and not merely over the support part thereof.

Figure 10:
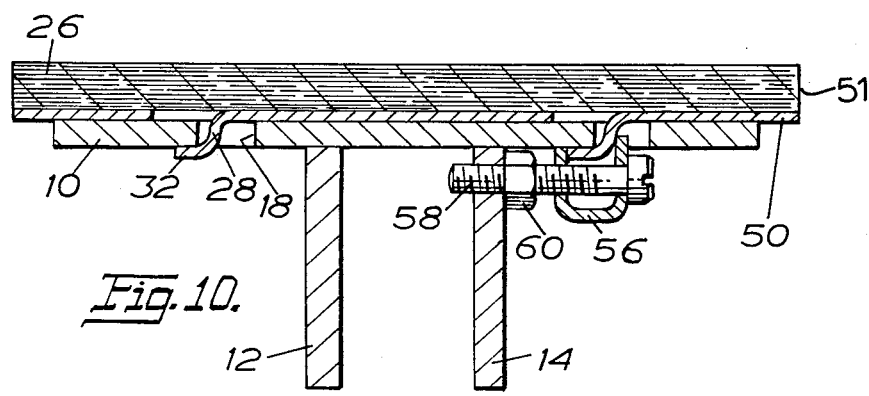
Figure 11:
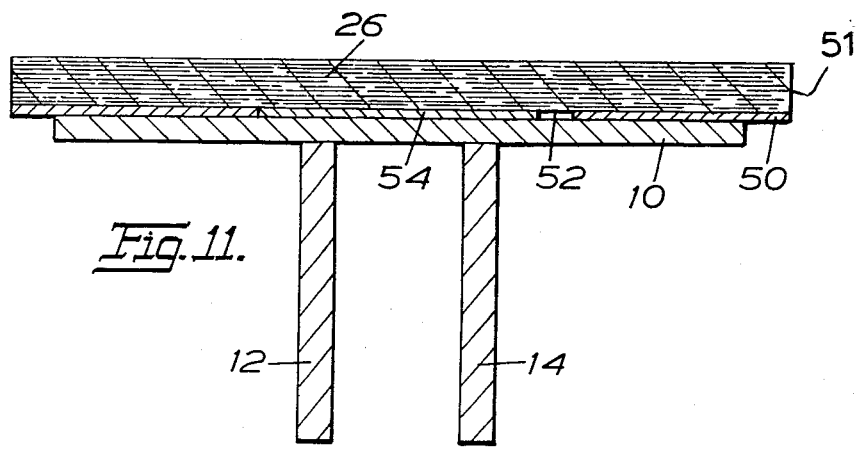

The invention will be described further, by way of example, with reference to the accompanying drawings, in which:

FIG. 1 is a radial section through a brake shoe and lining component assembly embodying the invention, FIG. 2 is a bottom view, of which the left-hand side is a developed view, of a carrier plate of the lining component, FIG. 3 is a top view, of which the left-hand side is a developed view, of a shoe platform of the assembly, FIGS. 4, 5 and 6 are axial sections respectively taken on the lines IV — IV, V — V and VI — VI of FIG. 1, FIG. 7 is a sectional detail, to an enlarged scale, of a locking projection on the carrier plate, FIG. 8 is a side elevation, partly in radial section, through another embodiment of brake shoe and lining component assembly, FIG. 9 is a reverse plan view of the assembly shown in FIG. 8, FIG. 10 is an axial section taken on the line X — X of FIG. 8, and FIG. 11 is an axial section taken on the line XI — XI of FIG. 8.

The brake shoe and lining component assembly shown in FIGS. 1 to 7 of the drawings comprises a part-cylindrical shoe platform 10 having welded thereto a pair of radially directed webs 12 and 14 arranged in spaced, parallel relation. The webs are intended, as by means of mounting holes 16, to be installed permanently in a vehicle brake. As will be most clearly evident from FIG. 3, the shoe platform 10 is formed with two groups of slots 18 and 20, of which the slots 18 are illustrated as being substantially square whilst the slots 20 are elongated and lie with their major dimension directed substantially circumferentially of the platform 10.

A replaceable lining component 22 secured to the shoe platform 10 includes a carrier plate 24 to which is bonded a friction lining 26. From the carrier plate 24 are struck two groups of preformed projections 28 and 30 corresponding respectively to the groups of slots 18 and 20 and it will be noted that while the projections 30 are plain radial projections which simply pass through and project slightly beyond the slots 20, the projections 28 terminate in tongues 32 having free end portions which are directed transversely of the carrier plate and are nearly parallel to the plane thereof. The lining component 22 is fitted to the shoe platform 10 by passing the projections 28 and 30 of the carrier plate 24 radially through their respectively cooperating slots 18 and 20 and by then displacing the lining component axially relative to the platform 10 to engage and lock the tongues 32 of the projections 28 behind the rear surface of the platform 10. The same axial displacement of the carrier plate 24 causes the projections 30, which initially are introduced into oversize regions 34 of the slots 20, to seat in circumferentially shorter regions 36 which are dimensioned closely to embrace the projection 30 and thus enable drag forces to be transmitted from the lining component to the shoe platform 10. The seating of the projections 30 in the slot regions 36 also acts to limit the axial displacement of the carrier plate with respect to the shoe platform.

FIG. 7 illustrates the manner in which the terminal end portions of the tongues 32, although nearly parallel to the plane of the neighbouring part of the carrier plate, are slightly angled in such a way as to engage with a wedging action against the adjacent side of the slot 18, thereby both establishing a further torque transmitting connection with the shoe platform and also controlling the extent to which the tongue overlies the underside of the platform.

For the purpose of preventing accidental separation of the carrier plate 24 from the shoe platform 10, a T-section clamping plate 38 is secured by a bolt 40 passing through its stem 42 to the web 14 (FIG. 5) and the plate 38 is formed in its head 44 with a slot 46 serving to receive an adjacently positioned projection 30. By appropriate manual adjustment of the bolt 40, the clamping plate 38 may be caused to bring one side of the slot 46 to bear against the projection 30 and thus lock the carrier plate against accidental axial movement. The bolt 40 may conveniently be locked in position by a lock nut 48. For removal of the worn lining, it is then only necessary to undo the locknut 48, move it along the bolt 40 until it abuts the clamping plate and then unscrew the bolt from the web 14 to push the carrier plate axially across the shoe platform to an extent sufficient to permit the tongues 28 and 30 to be withdrawn radially from their slots in the shoe platform. As shown in FIG. 1, more than one clamping plate 38 may be provided if desired.

As a precaution against fusion of the mating surfaces of the carrier plate 24 and the shoe platform 10, those surfaces may be treated with corrosion-resisting agents or alternatively an anti-corrosion shim may be interposed between them.

The embodiment of the invention shown in FIGS. 8 to 11 is generally similar to that already described and similar reference numberals are used wherever appropriate to denote similar parts. In this instance, however, the drag transmitting projections 30 and their cooperating slots 20 are omitted and in their place, the carrier plate 50 is formed with a centrally situated recess 52 wherein engages a cooperating projection 54 on the shoe platform 10 which may be a raised portion of the platform or which may, as shown, be a separate plate spot welded to the shoe platform. As can be seen in FIG. 8, the abutment member 54 has a height substantially equal to the thickness of the backing plate with the major portion of the abutment member being disposed radially inwardly of the convex face of the backing plate. The abutment member may project radially beyond the convex face of the backing plate with the friction material being recessed at 53 adjacent the aperture 52 to avoid interference between the projecting part of the abutment member and the friction material.

As an alternative form of clamping device, this embodiment of the invention also employs a generally U-shaped clamping member 56 secured by a bolt 58 and lock nut 60 to the web 14 and arranged to grip the terminal end portions 32 of the tongues 28. Adjustment of the bolts 58 enables the carrier plate to be moved in both axial directions relative to the shoe platform to permit substitution of a new lining component for a worn one and also serves to prevent accidental movement of the carrier plate, when clamped, and consequential accidental separation of the carrier plate from the shoe platform.

As can be most clearly seen from FIGS. 4, 5, 6, 10 and 11 the lining component, comprising friction material 26 bonded to backing plate 50, overhangs the shoe platform 10 at S1. This enables a standard sized shoe to be used with a variety of lining components to suit various applications. Further, the radial and circumferential retention means are spaced inwardly from the circumferential edge portions of the lining component. Thus if, for example, a wider lining component is required the extra width may be absorbed in the edge portions leaving the relative spacings of the radial and circumferential retention means constant, to suit a standard sized shoe. It is to be noted that the lining component axially overhangs the circumferentially directed edges of the shoe platform.

I claim:

1. A vehicle drum brake shoe comprising an arcuate shoe platform component and an arcuate carrier plate having rigidly attached thereto a correspondingly curved layer of friction material, said carrier plate having struck therefrom in the direction of its concave side a plurality of preformed projections, some of said projections defining tongues having axially extending portions which extend in the same direction and are spaced away from the concave side of said carrier plate substantially parallel thereto, a plurality of slots in said shoe platform each of a size to enable siad preformed projections including said tongues to be inserted into said openings when said carrier plate is moved radially into engagement with the convex face of the platform component, the spacing of the axially extending portions from the concave face of said carrier plate being such that the inner faces of the axially extending portions engage the concave surface of said platform component solely upon axial movement of said lining component following radial insertion of said projections into said slots, and retaining means comprising manually releasable clamping means between the shoe platform and the carrier plate for preventing separation of one from the other, at least some of said slots having opposed circumferential sides engaged by the corresponding edges of the projections therein to sustain separate from said retaining means the braking torque exerted on said friction material.

2. A brake as set forth in claim 1, wherein the clamping means comprises a T-shaped clamping plate having a stem and a head, a bolt carrying said clamping plate and adjustably secured to a part of the shoe platform component, said head being formed with a slot serving to receive and clamp one of the projections projecting from the lining component.

3. A brake as set forth in claim 1, wherein the clamping means is secured by an adjustable bolt to a part of the shoe platform and is of U-shaped configuration for gripping the terminal end portion of an adjacent tongue on the carrier plate.

4. A brake as set forth in claim 1, wherein all the projections are tongues having free end portions and wherein said carrier plate is formed with a centrally situated recess engaged by a cooperating projection on the shoe platform, the engagement between said projection and said recess serving to transmit from the lining component to the shoe platform component, the drag forces arising during braking.

5. The brake of claim 1 wherein two of said slots and projections are circumferentially spaced from each other, each slot having an oversized region leading into the circumferential dimension to enable the component to be moved radially into engagement with the platform and subsequently moved axially into a position in which the slots closely engage the projections in a circumferential direction.

6. A brake as set forth in claim 1 wherein the tongues are joined to the carrier plate by generally radial portions.

7. A brake as set forth in claim 6 wherein the terminal end of each tongue is arranged to diverge from the plane of the adjacent part of the carrier plate to an extent enabling it to engage in a wedge-like manner against the adjacent side of the slot in the shoe platform component through which said tongue passes.

* * * * *

UNITED STATES PATENT OFFICE
CERTIFICATE OF CORRECTION

Patent No. 3,941,222  Dated March 2, 1976

Inventor(s) Charles Newstead

It is certified that error appears in the above-identified patent and that said Letters Patent are hereby corrected as shown below:

On the cover sheet insert:

-- [30] Foreign Application Priority Data

Great Britain    10007/68    March 1, 1968 --.

Signed and Sealed this fifteenth Day of June 1976

[SEAL]

Attest:

RUTH C. MASON
*Attesting Officer*

C. MARSHALL DANN
*Commissioner of Patents and Trademarks*